United States Patent [19]

Toellner et al.

[11] Patent Number: 4,707,699

[45] Date of Patent: Nov. 17, 1987

[54] METHOD AND APPARATUS FOR POSITIONING A SATELLITE ANTENNA FROM A REMOTE WELL LOGGING LOCATION

[75] Inventors: Robert L. Toellner; George V. Copland, both of Duncan, Okla.

[73] Assignee: Halliburton Company, Duncan, Okla.

[21] Appl. No.: 701,721

[22] Filed: Feb. 14, 1985

[51] Int. Cl.[4] .............................................. H04B 7/185

[52] U.S. Cl. ...................................................... 342/352

[58] Field of Search .................. 343/352, 359, 356, 7.4

[56] References Cited

U.S. PATENT DOCUMENTS 3,242,494 3/1966 Gicca .

3,309,699 3/1967 Erdle .

3,378,845 4/1968 Welber .

3,434,142 3/1969 Andre et al. .

3,747,095 7/1973 Wilson ................................ 343/7.4

4,030,099 6/1977 Valenti et al. ........................ 343/7.4

*Primary Examiner*—Thomas H. Tarcza

*Assistant Examiner*—Donald E. Hayes, Jr.

*Attorney, Agent, or Firm*—William J. Beard

[57] ABSTRACT

A system and method for automatically pointing a microwave antenna at a desired satellite in geosynchronous earth orbit from a remote location, such as encountered in a well logging, is disclosed. The system uses a truck borne, gimbal mounted antenna and a computer arranged to automatically control and drive servo motors connected to the gimbal mounts of the antenna. Accurate pointing with minimal human intervention is achieved.

4 Claims, 4 Drawing Figures

METHOD AND APPARATUS FOR POSITIONING A SATELLITE ANTENNA FROM A REMOTE WELL LOGGING LOCATION

BACKGROUND OF THE INVENTION

1. Field of the Invention

This invention relates to method and apparatus for positioning or pointing a portable earth station antenna system on a satellite in geo-synchronous orbit and more particularly relates to such a system for automatically positioning such an earth station antenna from a remote location.

Recent satellite technology advances have placed satellites utilizing microwave frequency transponders in a geosynchronous orbit. In a geosynchronous orbit, of course, the satellite remains over approximately the same location on the earth surface, twenty-four hours a day and it appears motionless in the sky. The use of extremely high frequency transmitters such as Ku band microwave transmitters in the 14.0–14.5 gigahertz frequency region has provided the ability to reduce the size of parabolic dish antennas used to communicate information from the surface of the earth to the satellite and vice versa. With satellite spacings on the order of 2° apart, along the equatorial plane, it has become more and more difficult to accurately point an antenna at the correct satellite which it is desired to communicate with and to provide such communication without interference to other satellites.

In particular, positioning a small portable antenna by relatively unskilled personnel in field operations, such as in a well logging environment, can require that the specific direction of the radiated signal from the antenna be held within plus or minus one-tenth of a degree of the desired position. To set up an antenna and to send and receive signals from a geostationary satellite in a remote field location is a relatively difficult procedure even when accomplished by highly skilled personnel. The general procedure normally used by such highly skilled personnel would be to point the antenna in the proper direction and to verify that the correct satellite signal is being received by using a spectrum analyzer. Pointing requires the use of an accurate inclinometer and compass.

In the present invention, however, a system is provided for automatically positioning a portable parabolic reflector antenna, which may be located, for example, on the top of a well logging truck, by relatively unskilled personnel and completely automatically under computer control. Before going to a description of the system according to the present invention, however, a brief description of the prior art as known to the applicant is desirable.

2. DESCRIPTION OF THE PRIOR ART

U.S. Pat. No. 3,309,699 to Erdle relates to a mobile tracking system for communication satellites. A beacon signal developed by the satellite is used to broadly point the antenna toward the satellite. Accurate pointing is then achieved by interrogating the amplitude of a return signal generated from a signal transmitted to the satellite by the antenna station. The Erdle patent, however, does not disclose a method for aligning an antenna with a designated satellite by maintaining a constant elevation angle and scanning the azimuth angle automatically to peak on a beacon signal.

U.S. Pat. No. 3,378,845 to Welber discloses a satellite tracking apparatus for continuously directing an antenna toward a satellite. A beacon signal is generated with a particular frequency at an earth station. The satellite reflects the signals back to the earth station where the signal is processed by an antenna drive system (auto track equipment 24). The specific operation of this system is not disclosed in the Welber patent. However, the patent calls for acquiring the satellite by radar equipment or satellite orbital data; see, for example, Column 2, lines 9–15.

U.S. Pat. No. 3,434,142 to Andre, et al and U.S. Pat. No. 3,242,494 to Gicca are also of general interest for their disclosure of antenna position adjusting systems with respect to the present invention. However, neither of these patents disclose a system having the capabilities of the system of the present invention.

3. BRIEF DESCRIPTION OF THE INVENTION

A portable parabolic dish antenna carried on a well logging truck is positioned automatically by a portable computer system driving motors in a remote location according to the concepts of the present invention. Plural servo-motors may be used to drive the portable parabolic antenna in azimuth and elevation. The portable antenna may be, for example, mounted on the roof of a well logging truck in accordance with the concepts of the invention.

The earth latitude and longitude of the well site is entered into the portable truck computer along with the position of the desired satellite which it is to be communicated with on the Ku band. As the geosynchronous satellite will be at a fixed elevation angle relative to a given location, the portable parabolic antenna (whose base has been reasonably leveled) is adjusted by a computer to a predetermined elevation angle and pointed by the computer in a predetermined general direction of the satellite heading in azimuth. While keeping the elevation angle constant, the azimuth angle is swept slowly under computer control. The signal strength of the desired satellite transponder is monitored at the known signal frequency of the transponder. When the satellite signal is detected, a satellite transponder beacon channel is decoded to verify that the desired satellite and the specific transponder is being received. If the beacon signal does not decode, it is assumed that the signals are not from the desired satellite and the scan continued until the desired satellite is found. This azimuthal sweep is performed under computer control with equipment and computer software or firmware as will be described in more detail subsequently.

The invention may best be understood by reference to the detailed description thereof when taken in conjunction with the accompanying drawings. It will be recognized that the drawings and description included herein are submitted as descriptive of the invention, but not limitative in that respect.

DESCRIPTION OF THE PREFERRED EMBODIMENT

Figure 1:
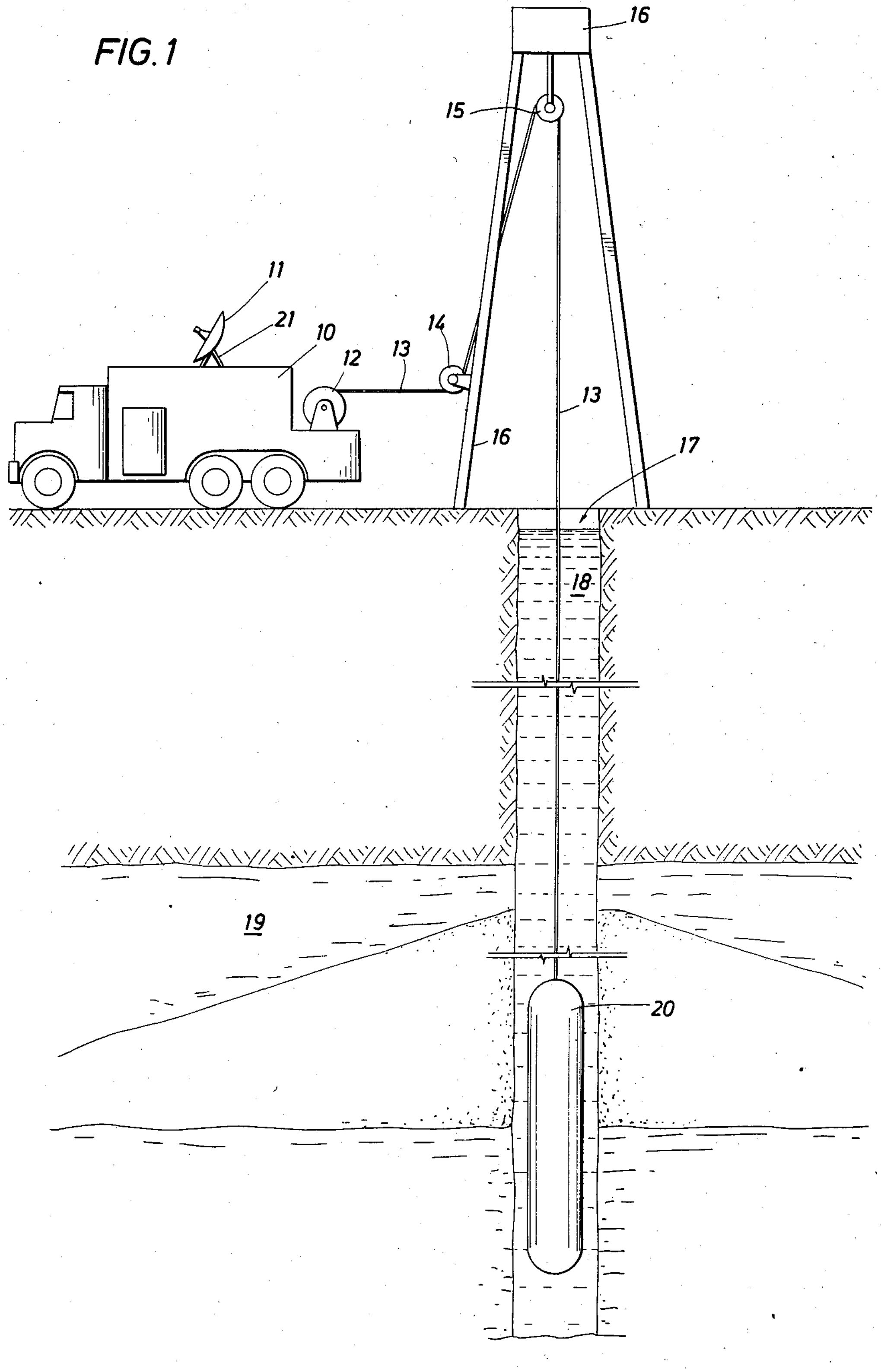
FIG. 1 is a schematic diagram showing a satellite antenna positioning system in accordance with the invention in use in a well logging environment.

Referring initially to FIG. 1, a satellite antenna positioning system in accordance with the concepts of the present invention is shown in a well logging environment in a remote well site location. A well logging truck 10 is supplied with armored logging cable on a cable reel 12. The cable 13 connects via sheave wheels 14 and 15 to a downhole well logging sonde 20. The sonde 20 is suspended by the cable 13 in a well borehole 17 which is filled with a borehole fluid 18. The downhole instrument 20 serves to measure physical parameters of interest with respect to the earth formations 19 in order to assist detecting the presence of hydrocarbon in the earth formations 19. The entire logging cable, sheave wheel, and sonde apparatus is suspended in the borehole 17 via a draw works or derrick 16.

A portable parabolic dish antenna 11 is shown mounted on the roof of the well logging truck 10. This antenna 11 is provided with a gimbal mount 21 which enables movement of antenna 11 in both azimuth and elevation. The mount 21 is supplied, as will be seen in more detail subsequently, with drive motors capable of driving the antenna 11 in both azimuth and elevation under control of a truck borne computer carried in the truck 10.

The communication to be established between the well logging truck 10 at the remote well site and a central computer base, located at a fixed location (for example, in a large city) are to be conducted through a satellite (not shown) which has been placed in a geosynchronous orbit above the surface of the earth. In a geosynchronous orbit the satellite appears to remain motionless over a fixed spot on the earth's surface. The satellite therefore has a predetermined azimuth and elevation angle which may be computed in a conventional manner given the well site latitude and longitude by the computer carried in the well logging truck 10. These azimuth and elevation data may be used to position the antenna 11 for communication with the satellite by the truck 10.

Such satellites have been placed in geosynchronous orbit recently utilizing approximately 14–15 gigahertz transponders on the satellite for communicating in the Ku band of microwave frequencies. Wide band communications may thus be provided from the well logging truck 10 at the remote site to a centrally located computer system. Voice and data link to the central computer system may be provided over the relatively wide band transponder channel provided by the geosynchronous satellite.

Earth formation measurements made by the downhole well logging sonde or instrument 20 of FIG. 1, may be transmitted directly to the central computer system for processing, or may be processed by a truck computer located on the logging truck 10 and the processed signals then transmitted to the satellite via the antenna 11.

Figure 2:
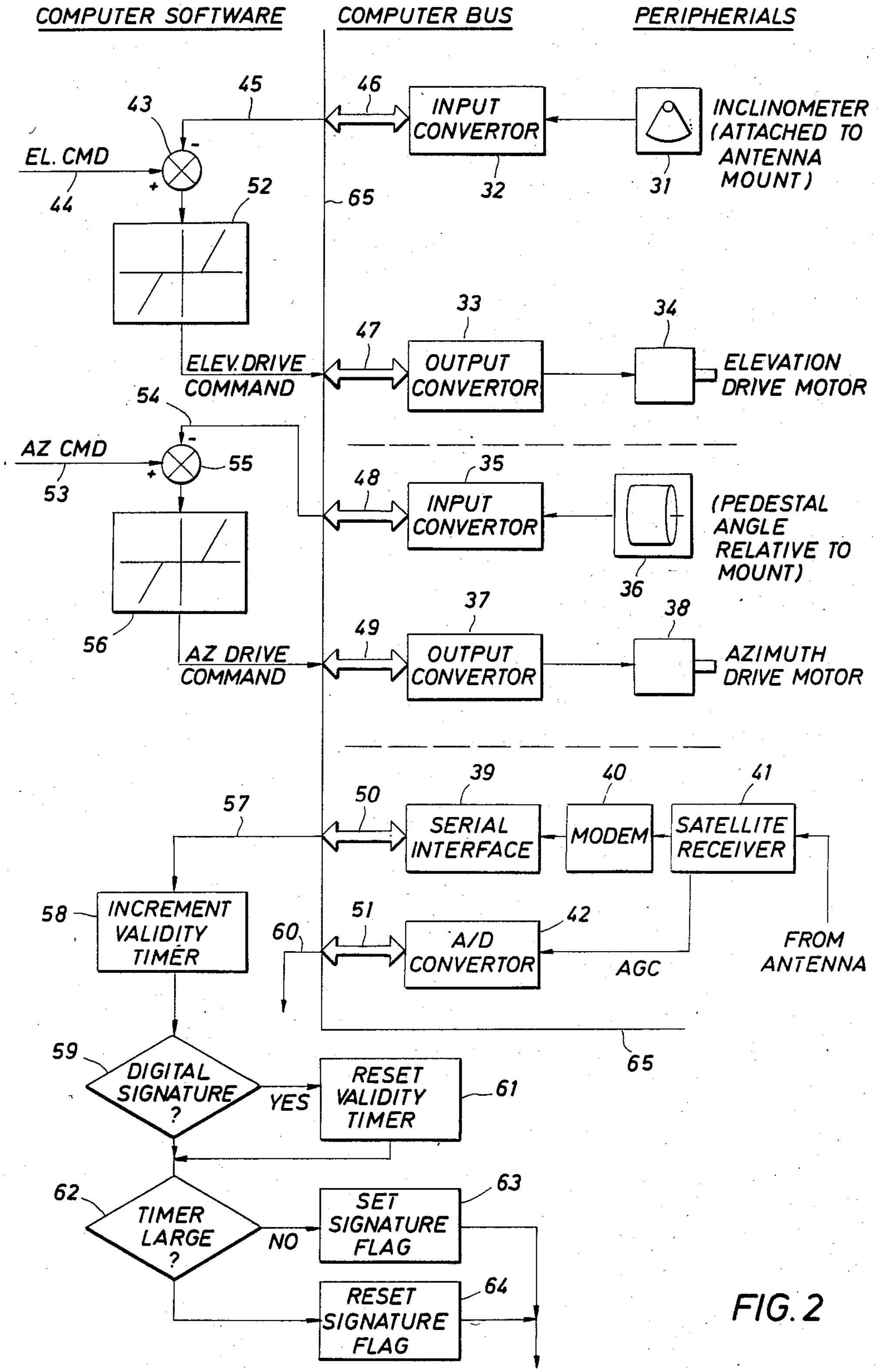
FIG. 2 is a schematic block diagram illustrating truck borne hardware and software or firmware equipment according to the concepts of the present invention used for positioning a portable parabolic dish antenna at a remote site.

Referring now to FIG. 2, the truck borne system for directing the satellite antenna 11 of FIG. 1 is illustrated in more detail but still schematically. This system is carried on the well logging truck 10 of FIG. 1. A small general purpose computer such as a Digital Equipment Co. of Cambridge, Mass. model PDP-11/750- or the like and associated peripheral equipment could be used. In FIG. 2, the portion to the left of line 65 refers to computer software or microprocessor firmware and the portion to the right of line 65 refers to computer peripherals and computer hardware.

On the hardware side of line 65, we see that a plurality of peripheral equipment are connected to the general purpose computer carried in the logging truck 10. An elevation inclinometer 31 is used to detect the angle of the antenna 11 with respect to the vertical for elevation control. Signals from the elevation inclinometer 31 are input by an input converter 32 and the computer bus 46 into the computer software or firmware where it is further processed in the manner which will be described in more detail subsequently. Elevation drive command signals produced by the software or firmware program are output on the computer bus 47 to an output converter 33 which then drives the antenna 11 elevation drive motor 34.

Similarly, an azimuth drive channel of the antenna system is controlled by computer software or firmware by having a transducer 36 sense the pedestal angle (relative to its mount) of the antenna 11 of FIG. 1 and inputting this to the computer via an input converter 35 and computer bus 48. An azimuth drive command signal is output via a computer bus 49 to an output converter 37 and used to control an azimuth drive motor 38 to drive the antenna in azimuth in a manner which will be described in more detail subsequently.

The summation indicated at 43 of the input signals from lines 44 and 45 and applying the drive logic to the elevation drive motor (as indicated in block 52) on the software side of line 65 will be described in more detail subsequently with respect to FIGS. 3 and 4. Similarly, the generation of azimuth drive command signals will be described in more detail subsequently. These commands are derived from the pedestal angle input on line 54 to the summation 55 and the azimuth command signals on line 53. The logic portion of azimuth control is indicated at block 56.

The computer software or firmware described on the left of line 65 in FIG. 2 may be thought of as real-time computer software or firmware, in the sense that it must monitor and respond to its input signals as received from the transducer devices and a satellite receiver 41 (which is mounted on the antenna 11 proper of FIG. 1) to detect signals from the satellite. The real time software portion of FIG. 2 maybe thought of in three major sections. One such section controlling elevation, a second section controlling azimuth and a third section for detection of the correct signal from the satellite. With respect to this third section, the satellite receiver 41 detects 11.7–12.2 gigahertz signals from the antenna 11 (FIG. 1) and provides, via a modem 40 and a serial interface 39 to computer bus 50, input signals to the software or firmware program on line 57. Similarly, the satellite receiver 41 provides automatic gain control signals which are indicative of the strength or amplitude of the satellite signals via an analog to digital converter 42 and computer bus 51 to the computer software or firmware programs, as input on line 60.

The real-time portion of the software program for monitoring the satellite signals to determine whether a strong signal is being received and for decoding the serial data from the receiver modem 40 to detect a valid digital signature from the receiver is illustrated schematically near the lower portion of FIG. 2. The valid digital signature monitoring software comprises software for recognizing a predetermined digital signal or code which is supplied from the central computer location via the satellite to the antenna 11 on logging truck 10 of FIG. 1. This signal is used to determine that the antenna has been correctly pointed at the proper satellite and that the signal strength from the satellite has been maximized prior to beginning of well logging data transmission from the logging truck 10 to the satellite.

The real-time software or firmware to the left of line 65 in FIG. 2 is entered under operation of a real-time clock interrupt in the on board truck computer. When the software or firmware is entered, for example, at logic block 58 a validity timer is incremented. A test is then performed at logic block 59 to determine if the digital signature of the desired satellite has been received on this entry. If it has, a validity timer is reset at block 61 and control is then passed to logic block 62, where a timer magnitude test is performed. If a prescribed period of time has elapsed, a digital signature flag is set at logic block 64 and control is returned to the operating system. If the timer large test at block 62 fails then the signature flag is set at logic block 63 and control is returned to the system.

Thus, it is seen that the computer software to the left of line 65 of FIG. 2 operates in real-time to monitor the azimuth, elevation, signal strength and to monitor the validity of the signal being received from a particular satellite via antenna 11 of FIG. 1.

Figure 3:
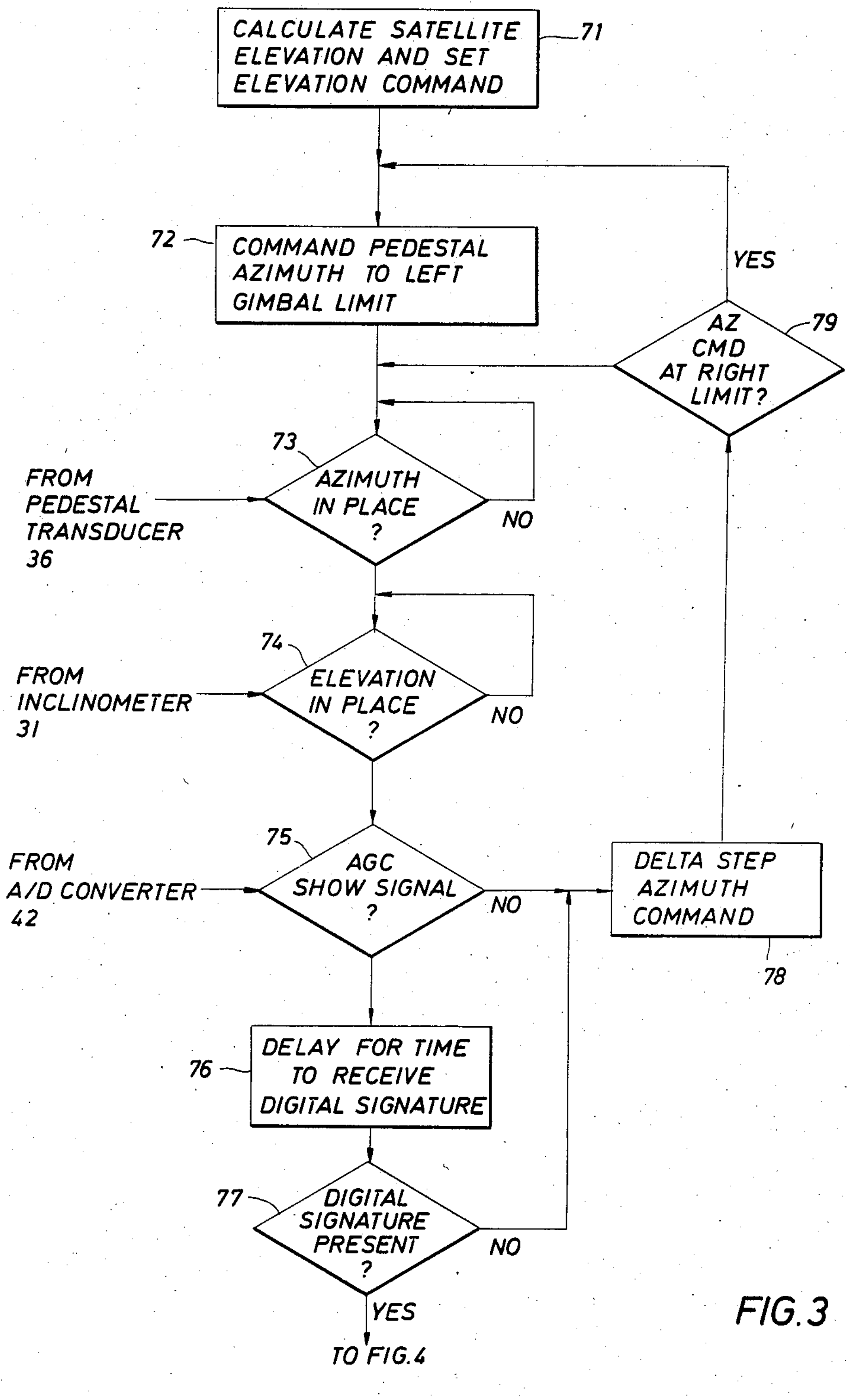
FIG. 3 is a flow chart diagram illustrating a portion of the control computer programming of the system of the present invention and FIG. 4 is a flow chart diagram illustrating a portion of the control computer programming of the present invention.

Referring now to FIG. 3 a non-real-time program for controlling the scan of antenna 11 and generating azimuth and elevation command signals for inputs on lines 44 and 53 of FIG. 2 is illustrated. Entry into logic block 71 of this program is made from the operating system at initialization of antenna set up. At logic block 71 the satellite elevation is computed from the known coordinate (latitude and longitude) of the well site location and the known location of the satellite. Control is then passed to logic block 72 where a command pedestal azimuth signal to the left gimbal limit is given. Control is then passed to logic block 73 where a test is performed to see if the azimuth is in place which the program has commanded. This test is performed by comparing the present azimuth location from the pedestal transducer 36 with the command location. If the commanded azimuth has not been reached, the program simply loops back and continues to perform this test until it is. When the azimuth in place test is passed, control is transferred to logic block 74 where an elevation in place test is performed. In performing this test, the actual location of the elevation inclinometer 31 of FIG. 2 is compared with the commanded elevation. Control is transferred back to logic block 74 until the commanded elevation has been reached. When the commanded elevation has been reached, control is transferred to logic block 75 where an automatic gain control show signal from A to D converter 42 is tested. This test determines if the satellite antenna is presently pointed at a satellite which is transmitting a signal strong enough for satellite receiver 41 of FIG. 2 to detect it. If it is not, control is transferred to the delta step azimuth command logic block 78 which increments the azimuth toward the right hand end of the azimuth gimbal.

A test is performed at logic block 79 to determine if the gimbal angle has reached the extreme right limit. If not, control is then transferred back to logic block 73. When a signal has been detected at logic block 75, control is transferred to logic block 76 which introduces a delay for a time sufficient to receive the digital signal by a computer interface 50 on line 57 before transferring control to logic block 77. At block 77 a test is performed to determine if a digital signature is present.

Figure 4:
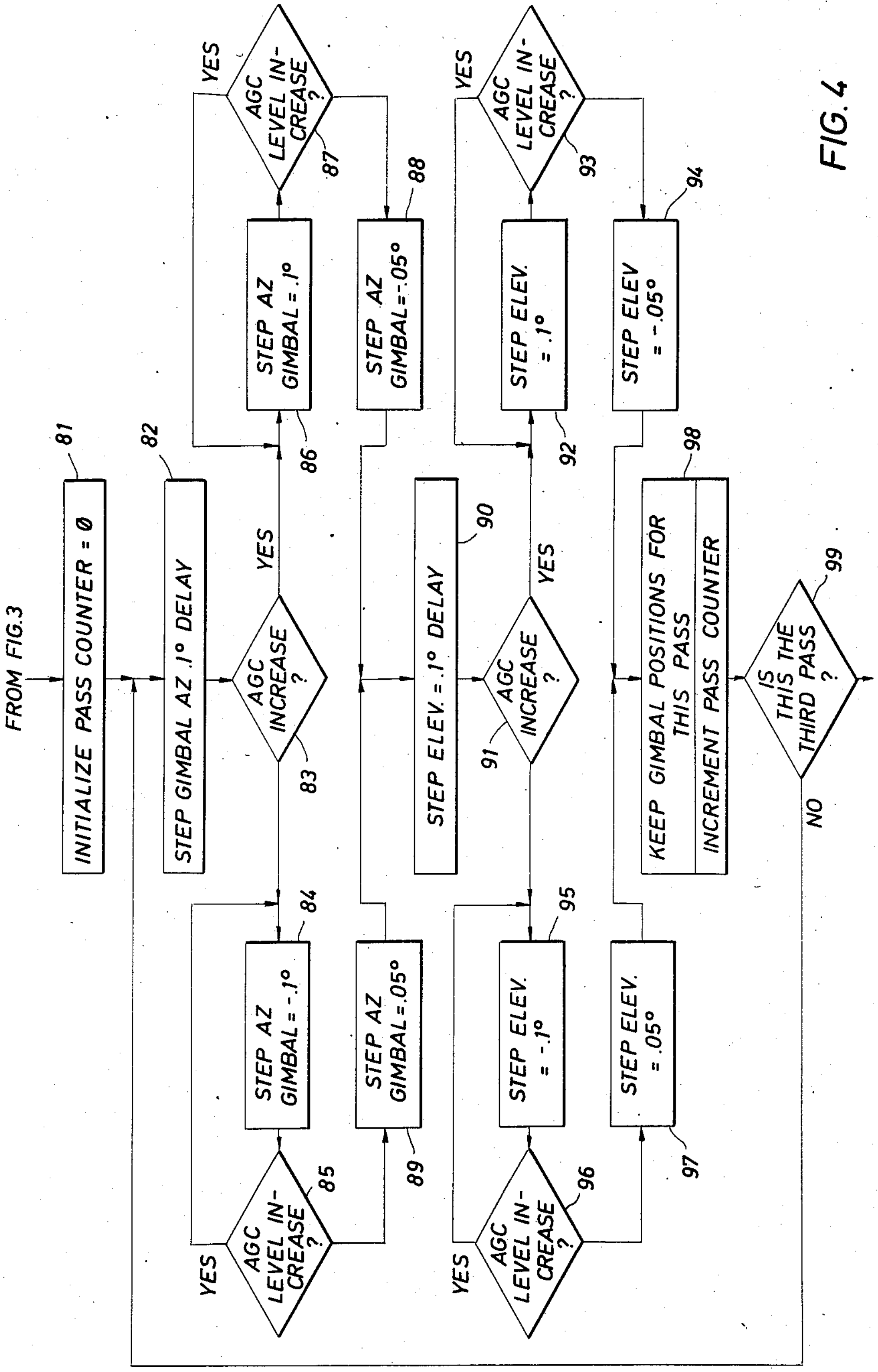

When the logic test at block 77 indicates a digital signal is present, control is transferred to the subroutine illustrated in more detail in FIG. 4. This routine locks the antenna onto the strongest signal. Upon entry at logic block 81, an initial pass counter is set equal to zero. Control is then transferred to block 82 where a gimbal step gimbal azimuth +0.1° signal is generated and control is transferred to logic block 83. If this causes a signal AGC increase as detected at block 83, control is transferred to logic block 86 where the azimuth gimbal is stepped −0.1° and the test at block 87 is entered to see if the AGC level continues to increase. If it does, the azimuth is stepped another +0.1° by returning control to logic block 86. If not, control is transferred to logic block 88 where the azimuth gimbal is stepped −0.05° and control is transferred to logic block 90. If the test at logic block 83 has failed, control is transferred to logic block 84 where the azimuth gimbal is stepped a negative 0.1° and a test performed at logic block 85 to determine if this increases the AGC level. If it does increase the AGC level, control is returned to logic block 84 and the negative increment repeated. If the logic test at block 85 fails, control is transferred to logic block 89 where the azimuth gimbal command is stepped 0.05° in the positive direction and control is transferred to logic block 90.

Similar logic is applied to the elevation command signals beginning at logic block 90 where an elevation step of positive +0.1° is commanded. Control is then transferred to logic block 91 where it is determined whether this results in an automatic gain control (AGC) signal increase via input line 60 and computer bus 51. If this does result in an AGC increase, control is transferred to logic block 92 where the elevation command is stepped another +0.1° and a test is performed at logic block 93 to determine if this results in an automatic gain control level increase. If the test at logic block 93 is positive, control is returned to logic block 92 and the process continued. If it does not, control is transferred to logic block 94 where the elevation is stepped a −0.5° and control transferred to logic block 98.

If the test at logic block 91 fails initially the elevation gimbal command is stepped −0.1° at logic block 95 and control is transferred to the test at logic block 96 to determine if this results in an AGC level increase. If it does, control is transferred back to logic block 95. If it does not, control is transferred to logic block 97 where the elevation command signal is stepped +0.05° and control transferred to logic block 98. At logic block 98 the determination that the optimum gimbal positions have been detected is made and the pass counter is incremented. Control is then passed to logic block 99 where the pass counter is tested to determine if at least three passes have been made through the entire program. If not, control is then returned to block 82 and the process continued. If the third pass has been made, then the antenna should be locked to the optimum angle for receiving the satellite and control is returned to the real-time portion of the system. Three passes are made because angular motion is not commutative (i.e. a series of rotations does not commute).

Thus, it may be seen that the softward portion of the antenna directing system of the present invention starts an azimuthal scan when the elevation angle has been reached which it is determined would be correct for the satellite from the location of the well logging truck 10. The azimuthal scan continues until a particular satellite is sensed and the signal from that satellite optimized by making small changes in elevation and azimuth until an optimually strong signal is received. Control is then turned over to the operating system for maintaining the antenna in this direction by the real time program and the communication link between the well logging truck 10 of FIG. 1 and the central computer center is opened for use.

Thus, it may be seen that the system of the present invention provides method and apparatus for accurately pointing a portable Ku band antenna located on a well logging truck at a remote location to a particular geosynchronous satellite and for establishing optimum signal conditions with the satellite and opening the communications channel for use by the truck equipment. This provides a communications path for both digital information from measurements made in the well borehole and voice communications.

While the foregoing descriptions may make other alternative embodiments of the invention apparent to those skilled in the art, it is the aim of the appended claims to cover all such changes and modifications as fall within the true spirit and scope of the invention.

We claim:

1. An automatic system for positioning a Ku band microwave antenna accurately to within approximately 0.1 degrees to point at a particular satellite located among others having as close as 2 degree angular spacing in geosynchronous earth orbit from a remote location for establishing a Ku band microwave communication link from the remote location via the satellite, comprising:

a Ku band microwave antenna having a gimbal mount adapted to move in at least azimuth and elevation;

means for driving said gimbal amount in azimuth and means for driving said gimbal mount in elevation;

means for sensing a satellite signal detected by said antenna and for producing an output signal representative of the strength of said satellite signal and a separate output signal indicative of a satellite code or signature;

inclinometer means for measuring the actual elevation angle of said elevation gimbal with respect to vertical and for generating an output signal representative thereof;

means for measuring the azimuth angle of said azimuth gimbal relative to a fixed reference and for generating an output signal representative thereof;

computer means capable of receiving input data comprising the earth latitude and longitude of a remote location and a satellite position and capable of receiving as inputs said strength representative signal, said satellite code or signature indicative signal, said elevation representative signal and said azimuth representative signal and further being capable of generating output command signals to said driving means to drive said azimuth and elevation gimbals to commanded positions the initial commanded position of said azimuth gimbal being one of its stops;

means, included in said computer means, for pointing said elevation gimbal to a fixed direction and for scanning said azimuth gimbal to a computed direction based on said earth latitude and longitude and said satellite position signals and then for varying the pointing of said gimbals in response to said signal strength signal in such a manner as to optimize said strength signal; and wherein said computer means further includes means capable of receiving said input signal indicative of a satellite code or signature and means for comparing said code or signature input signal with a predetermined reference code or signature signal in the memory of said computer means to verify the pointing of said antenna at the correct satellite and means responsive to such comparison for moving said gimbal mount in azimuth away from its initial stop position if said comparison fails to match.

2. The system of claim 1 wherein said step of varying the pointing in response to said signal strength is repeated at selected periodic intervals to maintain accurate pointing throughout a data transmission via the satellite.

3. A method for automatically positioning a microwave antenna accurately to point at a satellite in geosynchronous earth orbit from a remote location for establishing a communications link from the remote location via the satellite, comprising the steps of:

positioning a microwave antenna having a gimbal mount adapted to move at least in azimuth and in elevation in an approximately level position in a remote earth location, said gimbal mounts being adapted to be automatically driven in azimuth with respect to a reference and in elevation with respect to vertical and being equipped with sensors to detect their actual azimuth with respect to a reference and elevation with respect to vertical and to generate signals representative thereof;

inputting to a control computer the earth latitude and longitude of the remote location of said antenna and the location of a geosynchronous satellite to which it is desired to point said antenna;

automatically computing in said control computer the elevation angle of the satellite at the remote locations and automatically driving the elevation gimbal to this angle and stopping said gimbal;

initially driving the azimuthal gimbal to one of its stops and then driving said azimuthal gimbal from this stop to an azimuth computed by said control computer for said satellite and stopping said gimbal;

sampling a received signal from said satellite and testing said signal for signal strength and generating an output signal to said control computer representative thereof and generating a second output signal to said computer representative of a satellite code or signature;

varying said elevation gimbal and said azimuthal gimbal in relatively small increments in response to said signal strength signal to optimize said signal strength signal; and comparing said received signal representative of a satellite code or signature from said satellite with a predetermined code or signature signal to validify that the correct satellite is being received.

4. The method of claim 3 wherein the varying step is repetitively performed during the communications interval to assure continued accurate pointing of said antenna toward the satellite.

* * * * *